United States Patent
Shim et al.

(10) Patent No.: US 7,515,649 B2
(45) Date of Patent: Apr. 7, 2009

(54) SIGNAL TRANSMITTING METHOD IN MOBILE COMMUNICATION SYSTEM

(75) Inventors: Dong-Hee Shim, Gyeonggi-Do (KR); Bong-Hoe Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 624 days.

(21) Appl. No.: 10/834,210

(22) Filed: Apr. 29, 2004

(65) Prior Publication Data

US 2004/0264593 A1    Dec. 30, 2004

(30) Foreign Application Priority Data

Apr. 29, 2003    (KR)    ...................... 10-2003-0027144

(51) Int. Cl.
*H04L 27/00*    (2006.01)
(52) U.S. Cl. ...................................... 375/299
(58) Field of Classification Search ................. 375/299, 375/267, 302
See application file for complete search history.

(56) References Cited

U.S. PATENT DOCUMENTS

| | | | | |
|---|---|---|---|---|
| 6,298,092 | B1 * | 10/2001 | Heath et al. | 375/267 |
| 6,889,355 | B1 * | 5/2005 | Calderbank et al. | 714/792 |
| 2003/0043929 | A1 * | 3/2003 | Sampath | 375/267 |
| 2003/0050020 | A1 | 3/2003 | Erceg et al. | 455/101 |
| 2003/0123381 | A1 * | 7/2003 | Zhuang et al. | 370/208 |
| 2003/0143962 | A1 * | 7/2003 | Boariu | 455/106 |

FOREIGN PATENT DOCUMENTS

| | | |
|---|---|---|
| EP | 1117197 A2 | 7/2001 |
| JP | 04-151915 | 5/1992 |
| JP | 09-083600 | 3/1997 |
| JP | 10-247955 | 9/1998 |
| JP | 2001-156687 | 6/2001 |
| JP | 2001-345745 | 12/2001 |
| JP | 2002124899 | 4/2002 |
| JP | 3980559 | 7/2007 |
| WO | WO 00/03456 | 1/2000 |
| WO | WO 01/76110 A2 | 10/2001 |

OTHER PUBLICATIONS

Choi, Won-Joon, et al.; "Space-Time Block Codes Over Frequency Selective Rayleigh Fading Channels"; VTC Fall 1999; Sep. 22, 1999; vol. 5, pp. 2541-2545.
Panasonic; "Enhanced HARQ Method with Signal Constellation Rearrangement"; TSG-RAN Working Group 1 Meeting #19; TSGR1#19(01)0237; Las Vegas, Nevada, Feb. 27-Mar. 2, 2001.
Japanese Office Action dated Jul. 4, 2008.

* cited by examiner

*Primary Examiner*—Kevin Y Kim
(74) *Attorney, Agent, or Firm*—Ked & Associates, LLP

(57) ABSTRACT

A method of transmitting a signal in a mobile communication system using multiple antennas including allocating bit-mapped symbols to the multiple antennas based on a correlation among the multiple antennas. Further, allocating the bit-mapped symbols allocates bit-mapped symbols transmitted from antennas having a higher correlation among each other to be retransmitted from antennas having a lower correlation among each other, and allocates bit-mapped symbols transmitted from antennas having a lower correlation among each other to be retransmitted from antennas having a higher correlation among each other. In another example, allocating the bit-mapped symbols allocates the bit-mapped symbols to multiple antennas according to a detection efficiency of each symbol in addition to the correlation among the multiple antennas.

12 Claims, 9 Drawing Sheets

FIG. 1

|  | i1 | | | |
|---|---|---|---|---|
|  | i2 | | i2 | |
| q2 | 1011 ● | 1001 ● | 0001 ● | 0011 ● |
| II | 1010 ● | 1000 ● | 0000 ● | 0010 ● | I |
| III | 1110 ● | 1100 ● | 0100 ● | 0110 ● |
| q1 q2 | 1111 ● | 1101 ● | 0101 ● | 0111 ● | IV |

SIGNAL TRANSMITTING METHOD IN MOBILE COMMUNICATION SYSTEM

BACKGROUND OF THE INVENTION

1. Field of the Invention

The present invention relates to a signal transmitting method and apparatus in a mobile communication system using multiple antennas.

2. Description of the Background Art

In most coded modulation systems used in a wireless environment, gray mapping is performed on data (symbols) of 8 PSK (Phase Shift Keying) or 16 QAM (Quadrature Amplitude Modulation). For example, FIG. 1 illustrates a constellation using gray mapping for 16 QAM.

As shown in FIG. 1, when gray mapping is used, four bits are required to form one symbol of 16 QAM. In a HSDPA (High Speed Downlink Packet Access) system using a HARQ (Hybrid Automatic Repeat Request) function the data is transmitted via an antenna and is received by a receiver. If a retransmission is required, the order of bits of data that has been first transmitted is changed and then the data is retransmitted. Such an operation is called a constellation rearrangement.

The related art signal transmitting method is applied to a communication system having one transmission/receive antenna. However, currently there are Multiple Input Multiple Output (MIMO) communication systems having multiple transmitting antennas and multiple receiving antennas. In these type of systems, the independency of the symbols transmitted from each transmit antenna must be maintained to properly detect the transmitted symbols. However, the independency of the channels is not always maintained resulting in the symbols being not detected properly.

SUMMARY OF THE INVENTION

Accordingly, an object of the invention is to solve at least the above problems and/or disadvantages and to provide at least the advantages described hereinafter.

Another object of the present invention is to provide a novel signal transmitting method and apparatus with an improved symbol detection capability.

To achieve at least the above objects in whole or in parts, the present invention provides a novel method of transmitting a signal in a mobile communication system using multiple antennas including allocating bit-mapped symbols to the multiple antennas based on a correlation among the multiple antennas. Further, allocating the bit-mapped symbols allocates bit-mapped symbols transmitted from antennas having a higher correlation among each other to be retransmitted from antennas having a lower correlation among each other, and allocates bit-mapped symbols transmitted from antennas having a lower correlation among each other to be retransmitted from antennas having a higher correlation among each other. In addition, in another example, allocating the bit-mapped symbols allocates the bit-mapped symbols to multiple antennas according to a detection efficiency of each symbol in addition to the correlation among the multiple antennas. The present invention also provides a novel transmitting apparatus.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 1 illustrates a 16 QAM constellation using gray mapping;

FIGS. 2A and 2B respectively illustrate an example of a bit mapping order for a first transmission and retransmission (second transmission) in the 16 QAM constellation;

FIGS. 3A and 3B respectively illustrate a bit mapping order for other retransmissions (third and fourth transmissions) in the 16 QAM constellation;

BEST MODE OF THE INVENTION

Figure 4:
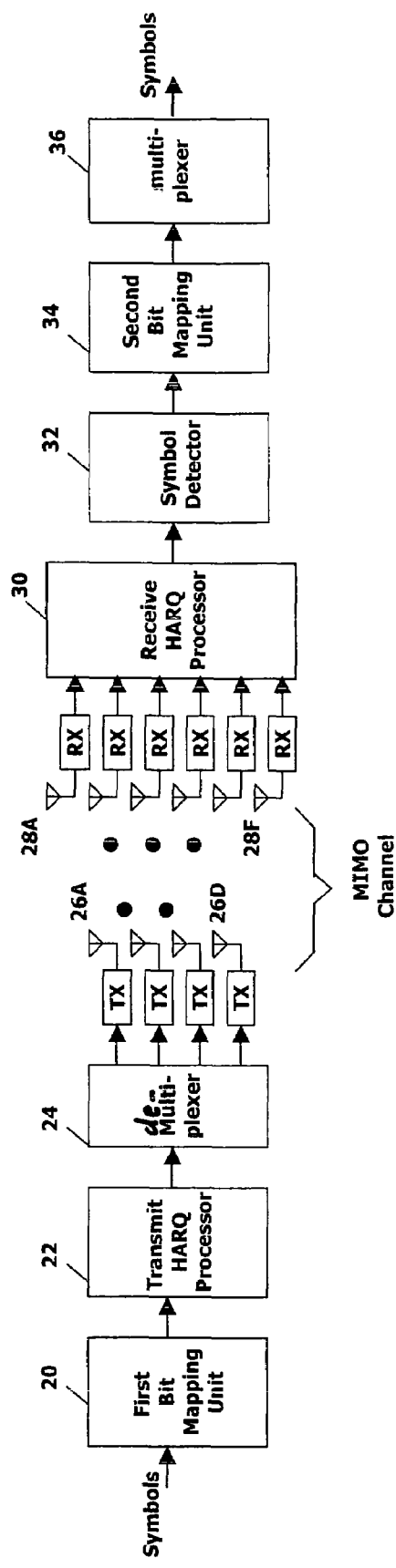
FIG. 4 is a perspective view illustrating a signal transmitting apparatus in a mobile communication system using multiple antennas in accordance with the present invention.

Assuming the order of four bits in 16 QAM is i1, q1, i2 and q2, the detection reliability of a bit differs depending on which value is allocated to each bit. Namely, in terms of positions, i1 and q1 have a higher reliability than i2 and q2 regardless of a bit value, and i2 and q2 have a relatively low reliability compared to i1 and q1. For example, with reference to the 16 QAM constellation in FIG. 1, the bit reliability of i1, q1 is greater than the bit reliability of i2, q2. That is, the first two bits are the same in each quadrant I, II, III and IV, and thus it is more likely that the first two bits of a mapped symbol into one of the quadrants are correct. For example, assume a data point "x" is detected in the first quadrant as shown in FIG. 1, and you are trying to determine the bit value of the detected data point (i.e., is the bit value 0011, 0001, 0000 or 0010?). Note that the first two bits are 00 for each data point in quadrant I. The same is not true for the bit values i2, q2. Thus, in this 16 QAM constellation, the bit reliability of i1, q1 is greater than the bit reliability of i2, q2.

As previously explained, if a retransmission is required, the order of bits of data that has been first transmitted is changed and then the data is retransmitted. A hybrid automatic repeat request (HARQ) function may be used to request such a retransmission of data.

Turning now to FIGS. 2A, 2B, 3A and 3B, which illustrate examples of the bit mapping order during a first transmission, and during second, third and fourth retransmissions in the constellation, respectively. As noted above, the bit reliability of i1 (q1) is higher than that of i2 (q2) in FIG. 2A (note FIG. 2A is the same constellation as FIG. 1). Assuming a HARQ e.g., NACK signal, has been received, the 16 QAM constellation may be changed to the 16 QAM constellation shown in FIG. 2B. Note in FIG. 2B, the bit reliability of i2 (q2) is higher than that of i1 (q1). That is, as shown, i1 (q1) has been switch-mapped with respect to the initial transmission for retransmission.

Next, FIG. 3A illustrates a 16 QAM constellation for a second retransmission in which the bit probability i1(q1) is more reliable than i2(q2) and there is invert mapping of i2 (q2) with respect to the first transmission. That is, the data point 0011 is switched with the data point 0000, and the data point 0001 is switched with the data point 0010 (see quadrant I). The data points for the other quadrants are inverted in a similar manner. Further, FIG. 3B illustrates a 16 QAM constellation for a third retransmission in which the bit probability i2(q2) is more reliable than i1(q2) and there is invert mapping of i2 (q2) with respect to the first transmission.

As noted above, the switch-mapping of the 16 QAM constellations is applied to communication systems including a single transmitter. However, in MIMO systems, the switch-mapping scheme does not always result in proper detection of the data, because there is correlation among the multiple transmitting antennas. For example, if there are four antennas, it is likely that antennas positioned at the outer side in the antenna array have a greater independence than antennas positioned at the inner side in the antenna array (that is, the outer antennas have less correlation among each other).

Turning now to FIG. 4, which illustrates a signal transmitting apparatus in a mobile communication system using multiple antennas in accordance with the present invention. As shown in FIG. 4, the signal transmitting apparatus includes a first bit mapping unit 20 for performing a bit mapping on a transmission system; a plurality of transmit antennas 26A-26D; a transmit HARQ processor 22 for arranging bit-mapped symbols according to the correlation among transmit antennas; a demultiplexer 24 for demultiplexing the symbols which have been processed in the transmit HARQ processor 22 and allocating the symbols to each transmit antenna (26A-26D); a plurality of receive antennas 28A-28F; a receive HARQ processor 30 for checking whether an error occurred in signals received through the receive antennas 28A-28F and for performing a retransmitting operation; a symbol detector 32 for processing a signal output from the receive HARQ processor 30 and for estimating/detecting a transmission symbol; a second bit mapping unit 34 for reversely mapping symbols detected by the symbol detector 32; and a multiplexer 36 for multiplexing symbols which have been reversely mapped in the second bit mapping unit 34 and for arranging the symbols in the transmitted order.

In addition, the transmission and receive HARQ processors 22 and 30 include a HARQ function in addition to the function of symbol arrangement (or rearrangement). Further, the symbol detector 32 processes a receiving signal to detect a symbol by using, for example, one of a zero-forcing, a minimum mean square error (MMSE) and a V-BLAST. In more detail, MIMO wireless communication systems use multiple-element antenna arrays to increase a user capacity in rich multipath environments by exploiting the spatial properties of the multipath channel. One such system is the vertical BLAST (Bell Laboratories Layered Space-Time) system using a vertically layered space-time architecture as opposed to a diagonally layered space-time architecture of a D-BLAST system. The V-BLAST system is described in "V-BLAST: An Architecture for Realizing Very High Data Rates Over the Rich-Scattering Wireless Channel" (ISSSE '98, October 1998) by P. W. Wolniansky, G. J. Foschini, G. D. Golden, and R. A. Valenzuela and in "Detection algorithm and initial laboratory results using V-BLAST space-time communication architecture" (IEEE, Vol. 35, No. 1, January 1999) by the same authors, both of which are incorporated by reference.

Figure 5:
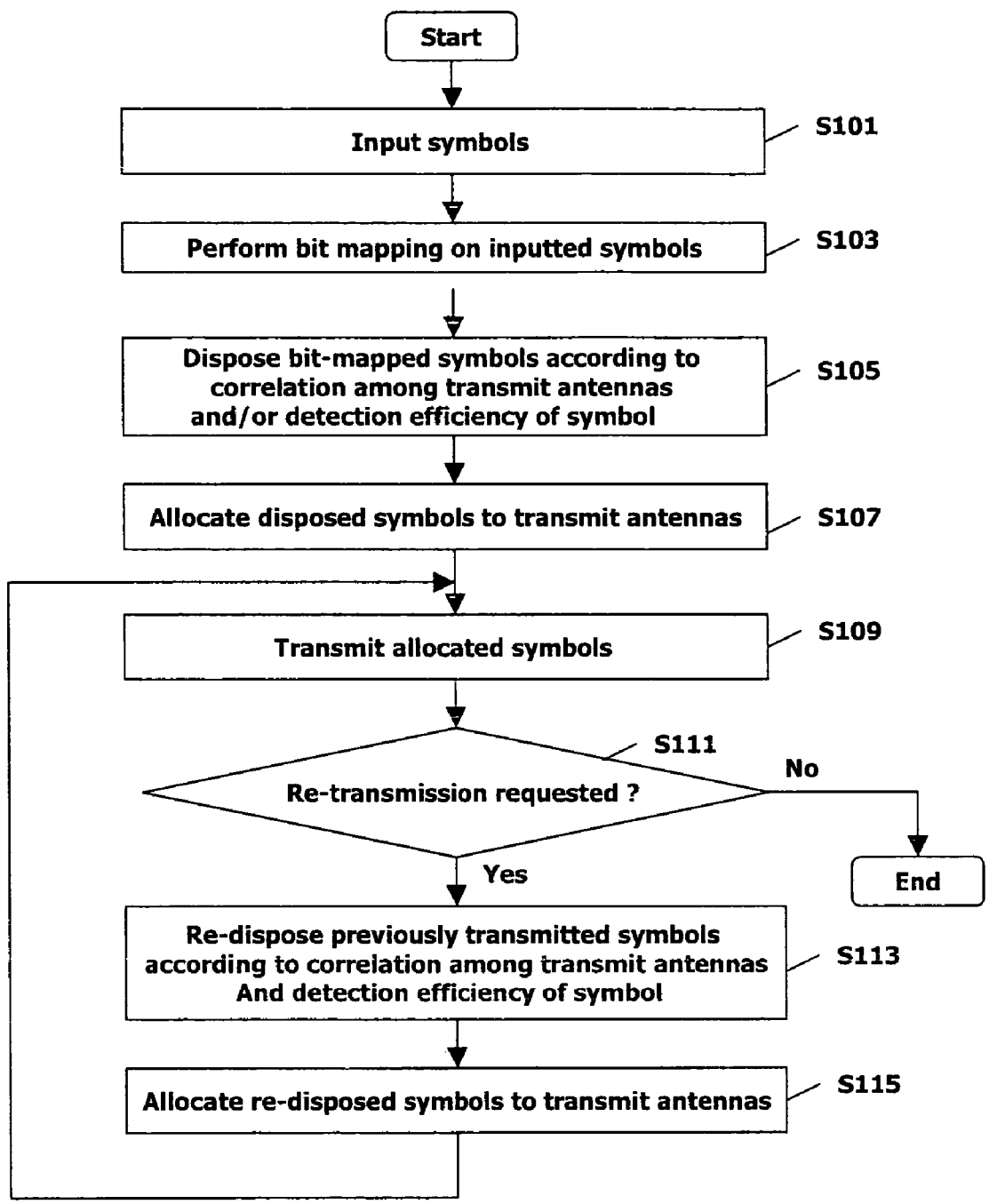
FIG. 5 is a flow chart of a signal transmitting method in accordance with the present invention.

The operation of the signal transmitting apparatus according to the present invention now be explained with reference to FIG. 5.

First, when a symbol to be transmitted is input (step S101), the first bit mapping unit 20 performs a bit mapping on the input symbol (step S103). The transmit HARQ processor 22 then couples the symbols which have been bit-mapped in the first bit mapping unit 20 with a CRC (Cyclic Redundancy Check) code or an FEC (Forward Error Correction) code used for error control and arranges transmission symbols based on the correlation among transmit antennas 26A-26D (step S105). Note step S105 also illustrates arranging transmission symbols based on the detection efficiency of the symbols. This additional feature is discussed later.

Then, in step S107, the demultiplexer 24 allocates the transmission symbols arranged by the transmit HARQ processor 22 to each transmit antenna 24A-24D. The transmit antennas 24A-24D then transmit the corresponding symbols to a receiving end through a MIMO channel (step S1 09).

The receive HARQ processor 30 then checks whether there is an error in the symbols received through each receive antenna 28A-28F. If the received symbols are not received in a sufficient state (i.e., there is an error), the receive HARQ processor 30 requests the symbols be retransmitted (Yes in step S111). The transmit HARQ processor 22 then rearranges the symbols based on a correlation among the transmit antennas (step S113) and allocates the rearranged symbols to each transmit antenna 26A-26D through the demultiplexer 24, thereby performing retransmission (step S115).

For example, the symbols transmitted via the outside antennas 26A and 26D may be retransmitted via the inner antennas 26B and 26C, and the symbols transmitted via the inner antennas 26B and 26C may be retransmitted via the outside antennas 26A and 26D.

In addition, the antennas maybe any number of antennas (eg., six antennas, etc.) and the reordering of symbols is done based on a correlation between antennas. For example, if antennas 3 and 5 have a high correlation, and antennas 1 and 6 have a low correlation, the symbols originally transmitted from antennas 3 and 5 may be retransmitted via antennas 1 and 6, etc. The symbols originally transmitted from antennas 2 and 4 may be retransmitted from the same antenna. Depending on the number of antennas, other allocations based on a correlation of antennas may be used.

If, however, the received symbols are received in a sufficient state (No in step S111), the receive HARQ processor 30 transfers the received signal to the symbol detector 32. The symbol detector 32 then processes the transferred signal based on the methods of zero-forcing, the MMSE and the V-BLAST, for example, to estimate/detect transmission symbols.

Next, the second bit mapping unit 34 reversely maps the detected symbols, and the multiplexer 36 mulitplexes the reversely mapped symbols and arranges the symbols in the transmitted order. In this instance, because the receiving end knows the modulation method used (e.g., QPSK or QAM) in the sending end, the symbol detection by the symbol detector 32 and the reverse mapping of bits by the second bit mapping unit 34 may be performed.

In this manner, when the transmit HARQ processor 22 transmits and retransmits the transmission symbols, the processor 22 allocates each symbol to each antenna based on the correlation among transmit antennas 26A-26D. Further, the receive HARQ processor 30 couples the transmitted (or retransmitted) symbols to the previously transmitted symbols, to thereby improve a receiving efficiency and an accuracy of symbol detection.

The method of arranging transmission symbols at each transmit antenna according to another example will be now be described.

Namely, according to the present invention, when a modulation scheme is used that has a same detection efficiency among symbols, such as BPSK (Binary Phase Shift Keying) or QPSK, a symbol may be rearranged based only on a correlation among antennas and then transmitted. However, when a high order modulation scheme that has a different detection efficiency of a symbol is used, such as QAM, the symbol may be rearranged based on the correlation among antennas and the detection efficiency and then transmitted. That is, the transmit HARQ processor 22 in this example arranges the bit-mapped symbols according to a correlation among transmit antennas in addition to a detection efficiency of a symbol.

Figure 6:
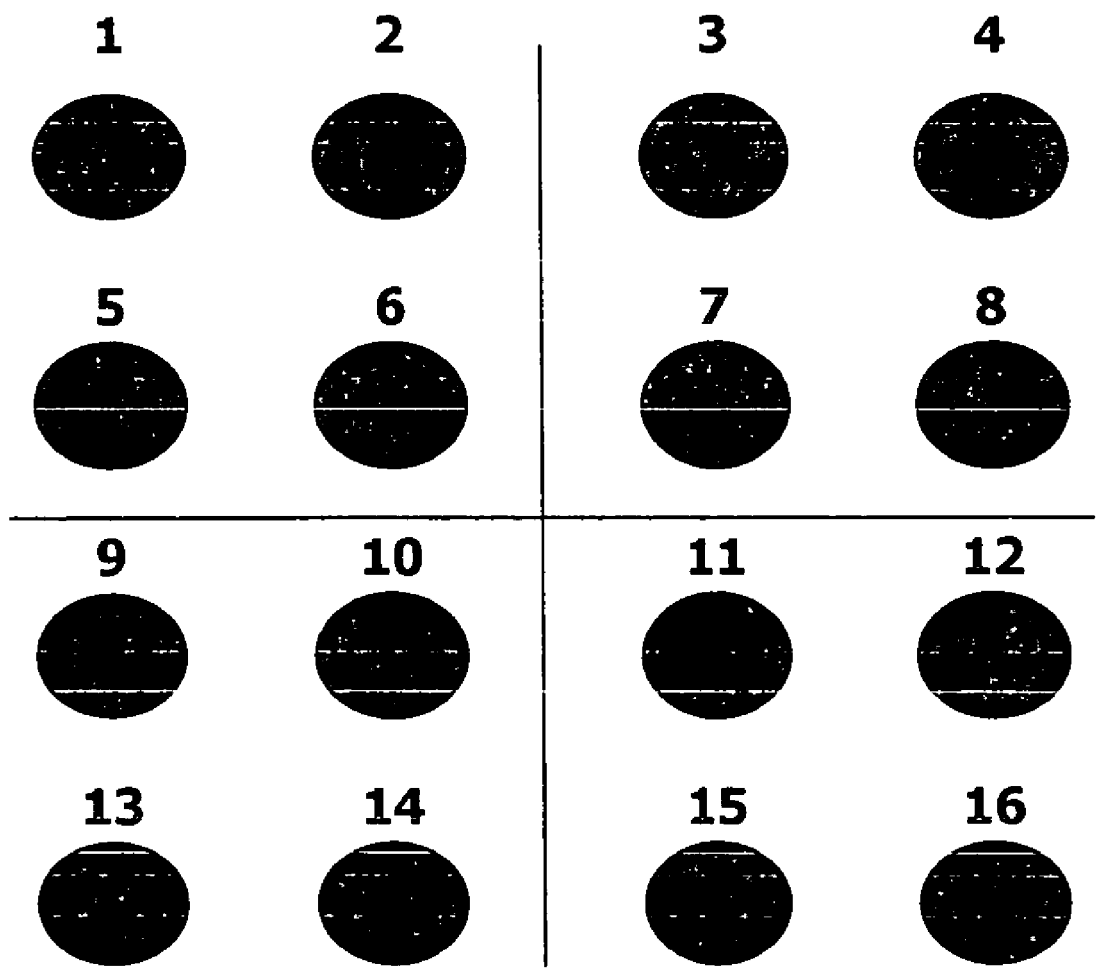
FIG. 6 illustrates another 16 QAM constellation.
Figure 7A:
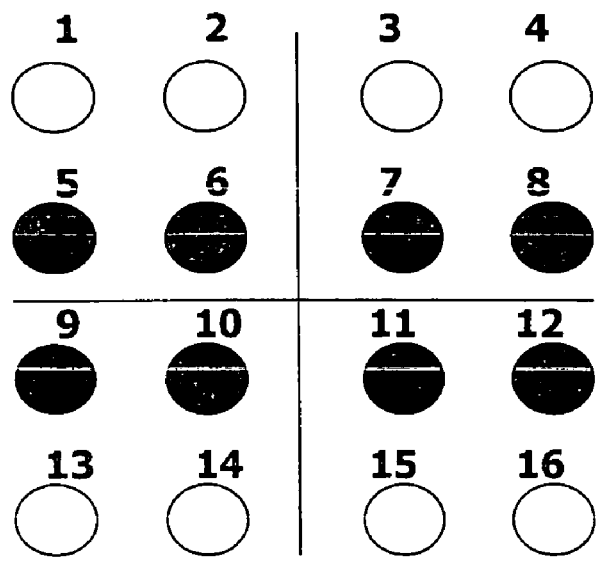
FIGS. 7A and 7B illustrate an example of an arrangement of bit-mapped symbols at each antenna according to a correlation among antennas and a detection efficiency of points within the 16 QAM constellation.
Figure 7B:
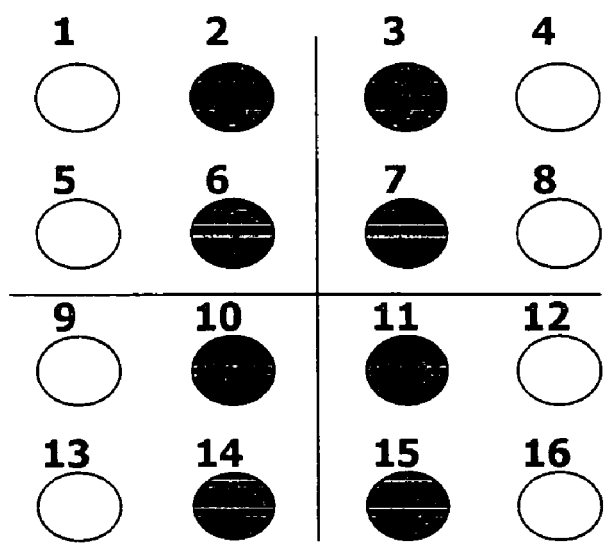
Figure 8A:
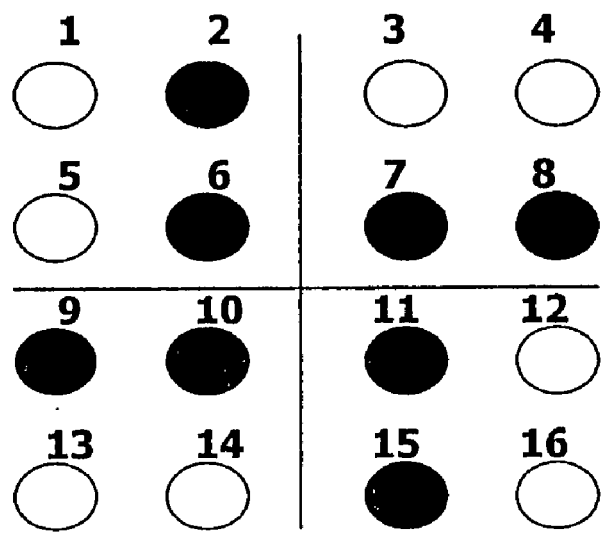
FIGS. 8A and 8B illustrate another example of an arrangement of bit-mapped symbols at each antenna according to a correlation among antennas and a detection efficiency of points within the 16 QAM constellation.
Figure 8B:
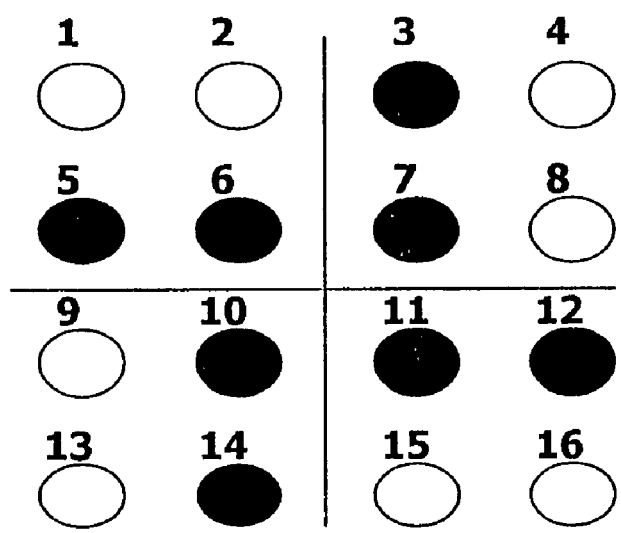
Figure 9A:
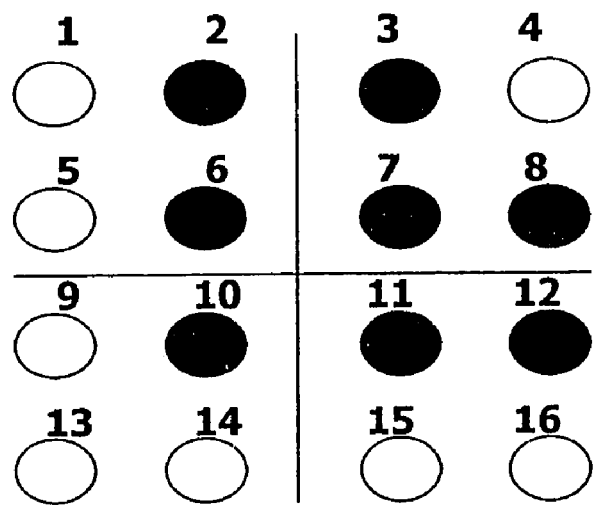
FIGS. 9A and 9B illustrate yet another example of an arrangement of bit-mapped symbols at each antenna according to a correlation among antennas and a detection efficiency of points within the 16 QAM constellation.
Figure 9B:
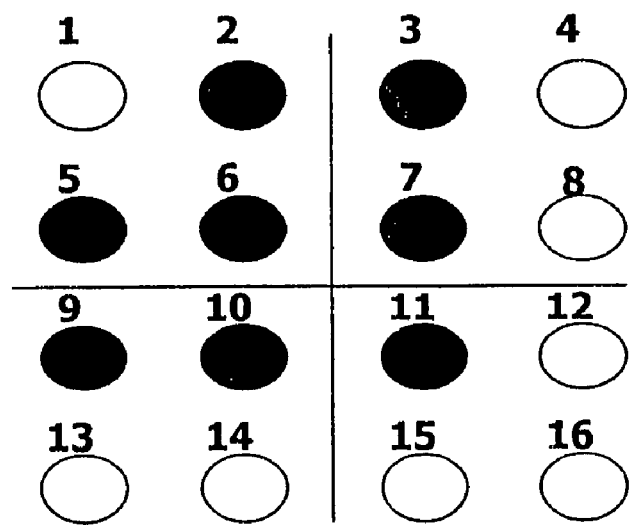

In more detail, FIG. 6 illustrates an example of a 16 QAM constellation, in which the outermost symbols 1, 4, 13 and 16 are more easily detected compared to the innermost symbols 6, 7, 10 and 11. Thus, the symbols 1, 4, 13 and 16 have a greater stability for symbol detection by the receiving end. Such properties are used for signal processing in the MIMO mobile communication system according to the present invention.

That is, a pair of symbols most distanced from the origin in the constellation of FIG. 6 are allocated to a pair of antennas having a higher correlation (e.g., a pair of antennas that are positioned next to each other or somewhat close to each other). Further, a pair of symbols close to the origin in the constellation are allocated to a pair of antennas having a lower correlation (e.g., a pair of antennas that are positioned away from each other such as antennas on the outside of the antenna array). In this instance, the pair of symbols refers to a pair of bit-mapped symbols.

In other words, when an antenna array has four transmitting antennas 26A-26D as shown in FIG. 4, the symbols 1, 4, 13 and 16 of the 16 QAM symbol constellation of FIG. 6 may be allocated to the pair of antennas 26B and 26C having a higher correlation than the pair of antennas 26A and 26D. In addition, the symbols 6, 7, 10 and 11 positioned at the inner side (i.e., the symbols having a shortest distance to each other) may be allocated to the pair of antennas 26A and 26D having a lower correlation than the antennas 26B and 26C. The remaining symbols 2, 3, 5, 8, 9, 12, 14 and 15 positioned at the same distance from the origin may be uniformly distributed to the four antennas 26A-26D.

In addition, if the number of symbols to be allocated to each transmit antenna is different, as many symbols as possible having a higher detection efficiency are allocated to a pair of antennas having a high correlation, and as many symbols as possible having a low detection efficiency are allocated to a pair of antennas having a lower correlation.

Other symbol arrangements will now be discussed. For example, FIGS. 7A through 9B illustrate examples of symbol allocation methods in which a transmission symbol refers to a bit-mapped symbol on the 16 QAM symbol constellation and the transmit antennas are assumed to be 26A-26D.

In more detail, in FIGS. 7A through 9B, the black symbols may be allocated to the antennas 26A and 26D and the white symbols may be allocated to antennas 26B and 26C. That is, the symbols 1, 4, 13 and 16 farthest from the origin and thus have a high detection efficiency may be allocated to the antennas 26B and 26C, while the symbols 6, 7, 10 and 11 that are close to the origin and thus have a low detection efficiency may be allocated to the antennas 26A and 26D.

Depending on how the remaining symbols 2, 3, 5, 8, 9, 12, 14 and 15 are distributed to the pair of antennas 26B and 26C and the pair of antennas 26A and 26D, various allocation forms as shown in FIGS. 7A through 9B can be made.

Further, when the symbols 1, 4, 13 and 16 farthest from the origin of the constellation are allocated to the transmit antennas 26B and 26C, the pair of symbols 1 and 16 and the pair of symbols 4 and 13 are allocated so the symbols are arranged to be distanced from each other to the maximum. Namely, if the pair of symbols 1 and 16 are allocated to the antenna 26B, the pair of symbols 4 and 13 are allocated for the antenna 26C, or vice versa.

In the same principle, when the symbols 6, 7, 10 and 11 closest to the origin are allocated to the antennas 26A and 26D, the pair of symbols 6 and 11 and the pair of symbols 7 and 10 are arranged to be distanced from each other to the maximum. Namely, if the pair of symbols 6 and 11 are allocated to the antenna 24A, the pair of symbols 7 and 10 are allocated to the antenna 26D, or vice versa.

Further, when all of the antennas are used by the sending end and the receiving end, the transfer rate of the data and the communication quality is improved.

As so far described, the signal transmitting method and apparatus in a mobile communication system of the present invention has the following advantages.

When the symbols which have been bit-mapped according to the correlation among the antennas by using the symbol arrangement method in accordance with the first example of the present invention, the symbol detection performance at the receiving end is improved compared to a case when the correlation among antennas is not considered.

In addition, in another example, the symbols to be transmitted are allocated to the antennas based on a detection efficiency of symbols and the correlation among antennas in a constellation, thereby providing an independent symbol transmission. Accordingly, the independence among antennas is improved, resulting in an improvement of accuracy of symbol detection by the receiving and the signal transmission capability of the system.

In addition, because the symbols are retransmitted based on the symbol detection efficiency and/or the correlation among antennas in a system using the HARQ, a communication quality is improved.

Further, embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A method of transmitting a signal using multiple antennas, comprising:

allocating bit-mapped symbols to the multiple antennas based on a correlation among the multiple antennas, wherein a pair of symbols farthest in distance to each other are allocated to a pair of antennas having a high correlation and a pair of symbols closest in distance to each other are allocated to a pair of antennas having a low correlation, wherein the bit-mapped symbols are allocated to the multiple antennas according to a detection efficiency of each symbol in addition to the correlation among the multiple antennas, and wherein allocating the bit-mapped symbols allocates bit-mapped symbols transmitted from antennas having a higher correlation among each other to be retransmitted from antennas having a lower correlation among each other, and allocates bit-mapped symbols transmitted from antennas having a lower correlation among each other to be retransmitted from antennas having a higher correlation among each other.

2. The method of claim 1, wherein allocating the bit-mapped symbols occurs during a retransmission of the bit-mapped symbols.

3. The method of claim 1, wherein the multiple antennas include an array of four antennas, and symbols originally transmitted from the inner two antennas are retransmitted from the outer two antennas and symbols originally transmitted from the outer two antennas are retransmitted from the inner two antennas.

4. The method of claim 1, further comprising mapping the bit-mapped symbols based on a bit reliability of bits in the bit-mapped symbols prior to allocating the bit-mapped symbols.

5. The method of claim 1, wherein allocating the bit-mapped symbols uniformly allocates any remaining symbols to all of the multiple antennas.

6. The method of claim 1, wherein allocating the bit-mapped symbols allocates bit-mapped symbols having a higher detection efficiency to antennas having a higher correlation among each other, and allocates bit-mapped symbols having a lower detection efficiency to antennas having a lower correlation among each other.

7. A transmitting apparatus using multiple antennas, comprising:

processor configured to allocate bit-mapped symbols to the multiple antennas based on a correlation among the multiple antennas, wherein the processor allocates a pair of symbols farthest in distance to each other in a constellation to a pair of antennas having a high correlation among each other and allocates a pair of symbols closest in distance to each other in the constellation to a pair of antennas having a lower correlation among each other, wherein the processor allocates the bit-mapped symbols to the multiple antennas according to a detection efficiency of each symbol in addition to the correlation among the multiple antennas, and wherein the processor allocates bit-mapped symbols transmitted from antennas having a higher correlation among each other to be retransmitted from antennas having a lower correlation among each other, and allocates bit-mapped symbols transmitted from antennas having a lower correlation among each other to be retransmitted from antennas having a higher correlation among each other.

8. The apparatus of claim 7, wherein the processor allocates the bit-mapped symbols during a retransmission of the bit-mapped symbols.

9. The apparatus of claim 7, wherein the multiple antennas include an array of four antennas, and symbols originally transmitted from the inner two antennas are retransmitted from the outer two antennas and symbols originally transmitted from the outer two antennas are retransmitted from the inner two antennas.

10. The apparatus of claim 7, further comprising a bit mapping unit configured to map the bit-mapped symbols based on a bit reliability of bits in the bit-mapped symbols prior to the processor allocating the bit-mapped symbols.

11. The apparatus of claim 7, wherein the processor uniformly allocates any remaining symbols in the constellation to all of the multiple antennas.

12. The apparatus of claim 7, wherein the processor allocates bit-mapped symbols having a higher detection efficiency to antennas having a higher correlation among each other, and allocates bit-mapped symbols having a lower detection efficiency to antennas having a lower correlation among each other.

* * * * *